May 13, 1941.  R. C. MASON  2,241,409
SHOCK ABSORBER
Filed June 13, 1938  3 Sheets-Sheet 1
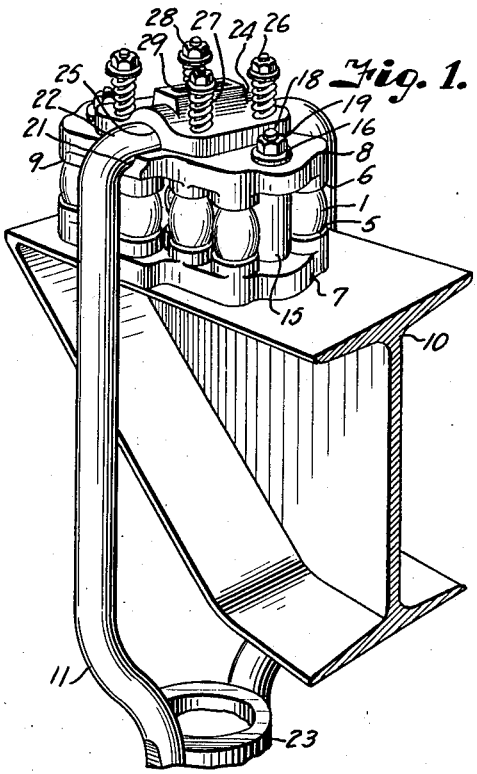
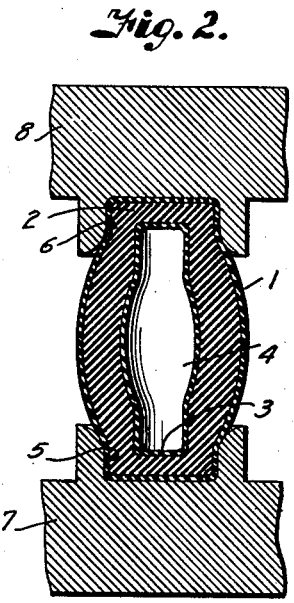
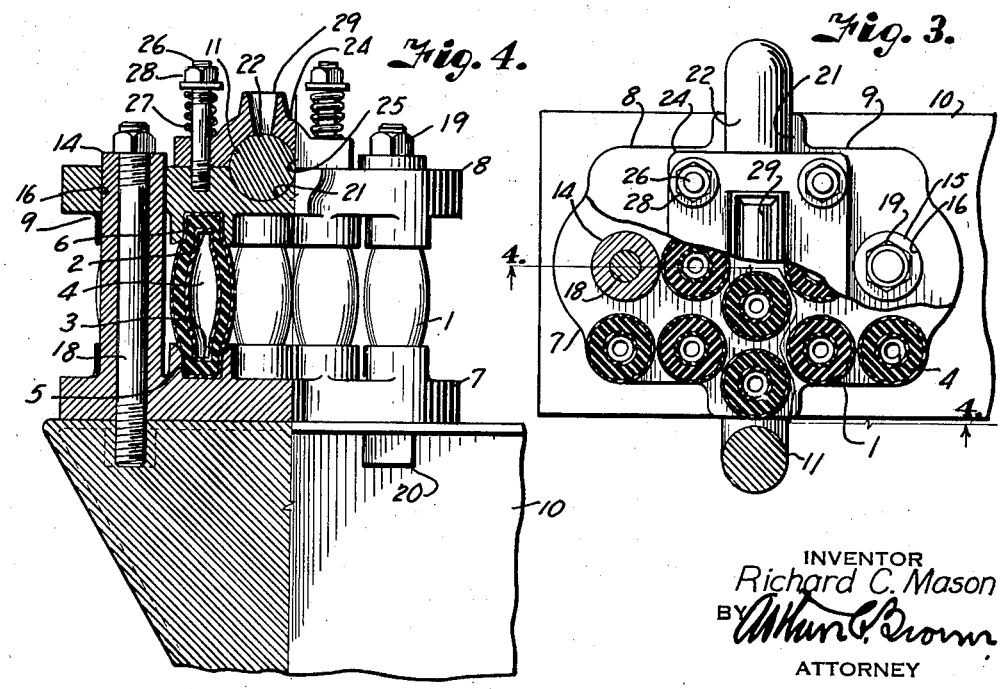
INVENTOR
Richard C. Mason
BY
ATTORNEY May 13, 1941.   R. C. MASON   2,241,409
SHOCK ABSORBER
Filed June 13, 1938   3 Sheets-Sheet 2
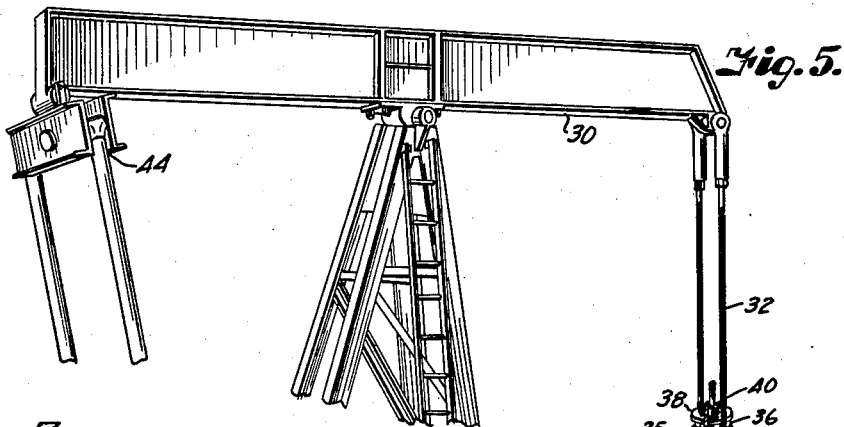
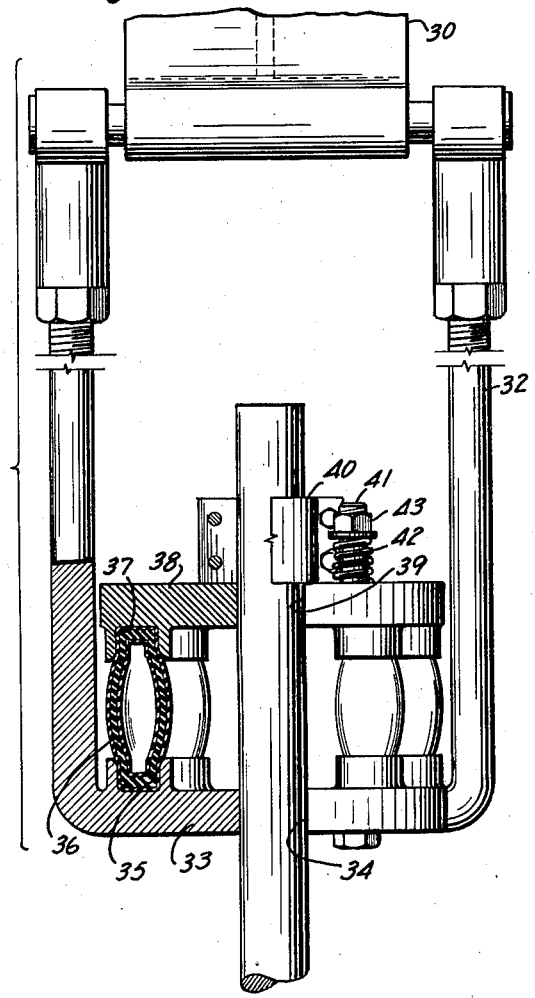
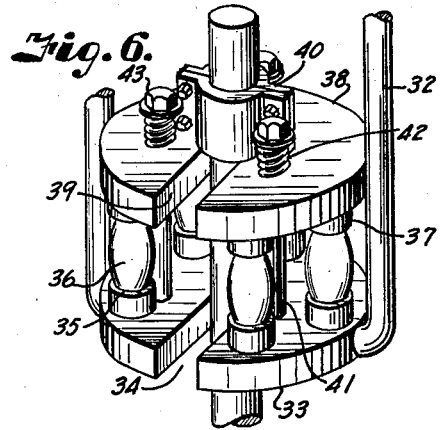
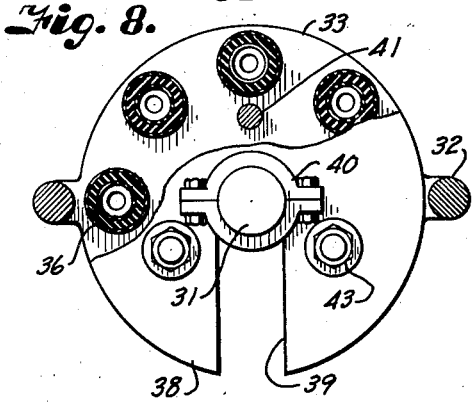
INVENTOR
Richard C. Mason
BY
ATTORNEY

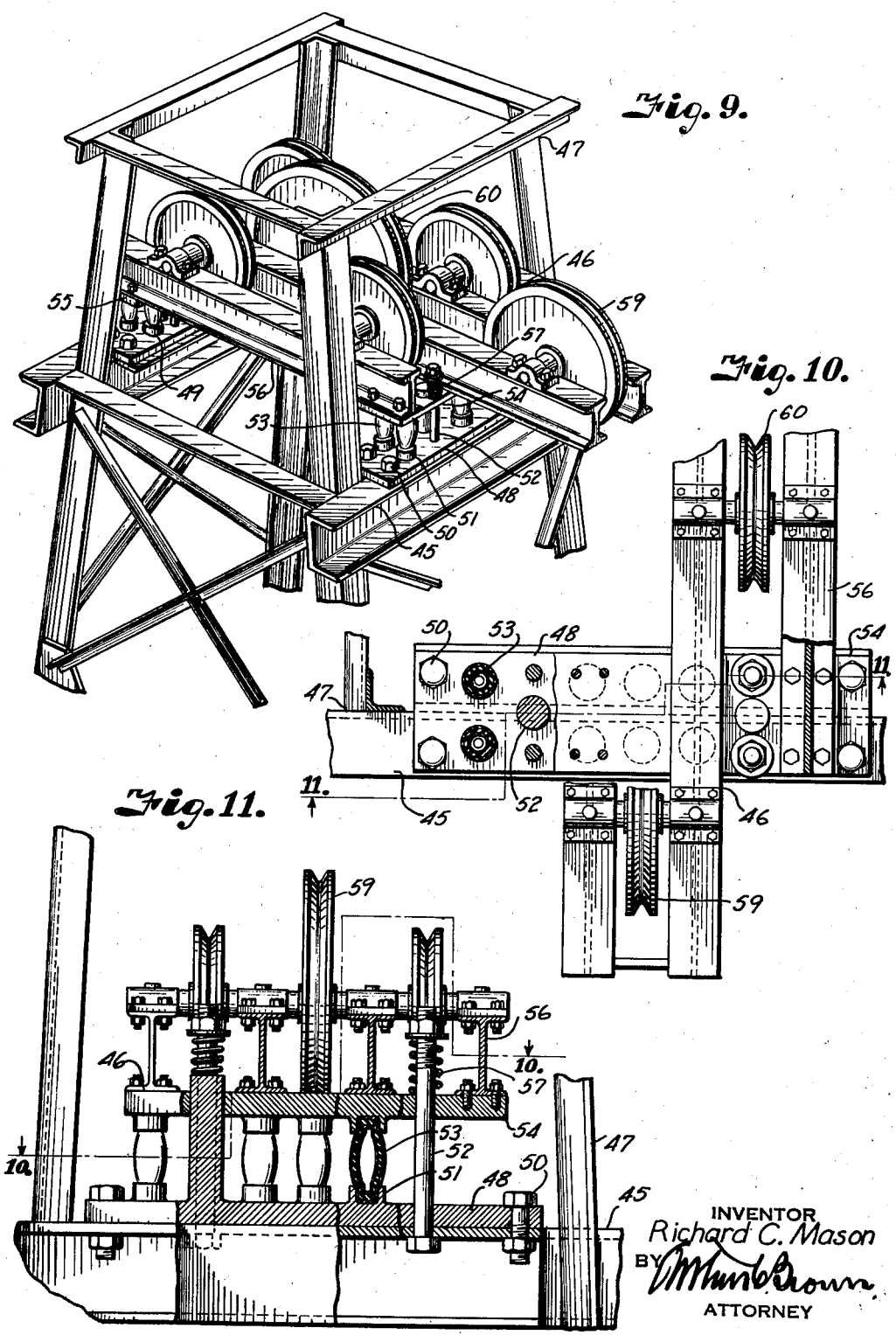

Patented May 13, 1941

2,241,409

UNITED STATES PATENT OFFICE 2,241,409

SHOCK ABSORBER

Richard C. Mason, Tulsa, Okla., assignor of three-sixteenths to Clarence Egan, Washington, Pa.

Application June 13, 1938, Serial No. 213,475

2 Claims. (Cl. 255—16)

This invention relates to shock absorbers and more particularly to a device of that character adaptable for absorbing shocks incidental to the use of well drilling and like equipment, as at the connections between a walking beam and its Samson-post, or between the pitman and/or polish rod connections with a walking beam, and for other purposes for which extreme resistance is required, as between the water table and crown block assembly of a rotary drilling rig; the principal objects of the present invention being to provide an efficient, convenient and economical shock absorber for such purposes.

In accomplishing these and other objects of the present invention, I have provided improved details of structure, the preferred forms of which are illustrated in the accompanying drawings, wherein:

Fig. 1 is a perspective view of a shock absorber embodying the features of the present invention showing its application at the connection between a walking beam and pitman stirrup.

Fig. 2 is a detail vertical cross-section through the head and base plate of a shock absorber embodying the present invention particularly illustrating a suitable type of resilient member interposed therebetween.

Fig. 3 is a plan view of the shock absorber illustrated in Fig. 1, partly in horizontal section, the head plate being broken away to illustrate the resilient members.

Fig. 4 is a side elevational view partly in vertical section, on the line 4—4, Fig. 3, illustrating the relative positions of the shock absorber elements to the walking beam and pitman stirrup.

Fig. 5 is a perspective view of a walking beam with polish rod attached, illustrating the application of a modified form of shock absorber embodying the features of the present invention therebetween.

Fig. 6 is a detail perspective view of the modified form of shock absorber illustrated in Fig. 5.

Fig. 7 is a detail elevational view of the shock absorber illustrated in Fig. 6 partly in vertical section to illustrate the construction of the resilient members.

Fig. 8 is a plan view, partly in horizontal section, of the form of shock absorber illustrated in Fig. 6.

Fig. 9 is a perspective view of a further modified form of shock absorber illustrating the application thereof to the water table of a drilling rig for absorbing shocks applied to a crown block assembly which it supports.

Fig. 10 is a detail plan view, partly in horizontal section on the line 10—10, Fig. 11, showing the relative positions of the shock absorber elements to the water table and crown block assembly.

Fig. 11 is an elevational view, partly in vertical section on the line 11—11, Fig. 10, further illustrating the relation of the shock absorber to the apparatus, the shocks of which it absorbs.

Referring more in detail to the drawings:

1, Fig. 2, designates a shock absorbing member which preferably consists of rubber or some similar resilient, flexible and/or inflatable material, said member preferably having a substantially barrel-like conformation, closed upper and lower ends 2 and 3 and a hollow interior 4. The member 1 is preferably puncturable in a suitable manner, as by a hollow needle, to inflate the same from the interior 4 thereof and thus increase the resistance of the member to shocks and similar pressures applied to either or both of its ends.

The ends 2 and 3 of the member 1 are mounted in suitable facing sockets 5 and 6 on each of a supporting member or base plate 7 and a supported member or head plate 8 in such a manner that shocks applied to the supported head plate are substantially absorbed through the member 1 incidental to transmission of the shocks to the supporting base plate 7.

This invention has many applications and in Fig. 1 a shock absorber 9 embodying the features thereof is shown, which is suitable for interposition between one end of a walking beam 10 and a pitman stirrup 11, the pitman stirrup being suitably adapted for rocking the end 10 of the walking beam.

The shock absorber 9, as illustrated in Fig. 1, preferably consists of a supporting base plate 7 mounted on the upper face of the walking beam at the outer end thereof, the base plate having spaced upwardly extending sockets 5 and aligned spaced upwardly extending guide members 14 and 15 at opposite ends thereof. The supported head plate 8 of the shock absorber conforms in shape to the base plate 7 and has downwardly extending sockets 6 arranged similarly to the sockets 5 on the base plate in such a manner that the ends 2 and 3 of a plurality of the members 1 may be applied to the sockets and thus resiliently support the head plate relative to the base plate. Spaced apertures 16 are also provided in the head plate of a size suitable for receiving the upper ends of the guide members 14 and 15 in order to provide slidable engagement between the plates.

The guide members 14 and 15 are each preferably provided with a bore which extends through the base plate, and have threaded rods 18 mounted therein, the lower ends of which extend through the upper flanges of the walking beam and the opposite ends of which are provided with suitable fastening devices 19 and 20 for securing the base plate to the walking beam, it being apparent that such fastening devices may include washers, for example, to prevent accidental displacement of the head plates from the guides.

In order to seat the stirrup, the head plate 8 is provided with a transverse groove 21 of a size adapted to snugly receive the bridging portion 22 of the stirrup in such a manner that upon actuation of the pitman 23 in the usual manner to rock the walking beam, the stirrup may pivot in the groove on the shock absorber head plate and thus apply straight line pressures to the walking beam.

It is desirable to positively retain the stirrup in its connected state with the shock absorber and indirectly the walking beam, and to this end, the cap member 24 is provided which has an offset groove 25 cooperating with the groove 21 to cover and pivotally mount the bridging portion 22 of the stirrup on the shock absorber. Spaced alignable apertures are provided in the cap member 24 and head plate 8 of the shock absorber which are adapted to receive threaded bolts 26 therein for mounting the cap member on the head plate over the stirrup. Springs 27 may also be mounted on the bolts 26, the lower ends of which seat on the upper face of the cap member and the upper ends of which are retained by washers or the like secured on the bolts by fastening devices 28, it being apparent that the cap member is thus yieldably mounted on the head plate to prevent binding of the pitman stirrup. An opening 29 may also be provided in the cap member 24 to permit lubrication of the pitman stirrup relative to its seat in the shock absorber.

In the operation of a shock absorber constructed and employed as described in connection with Figs. 1 to 4, it is believed apparent that, when the pitman is actuated, the walking beam is rocked due to the connection of the pitman stirrup 11 therewith through the shock absorber 9, and that the pitman stirrup is permitted to pivot during such actuation by its seat in the grooved head plate 8. On the downstroke of the pitman, pressure is applied to the head plate which, during transmission to the walking beam to rock the same, is absorbed by the resilient barrel-like inflatable members 1 to greatly relieve both the walking beam and pitman stirrup of strains and stresses incident to actuation of the walking beam. As the members 1 are compressed, the head plate slides down the guide members 14 and 15, and, as the pressure is released, the resiliency of the members 1 tends to effect repositioning of the head plate at the upper end of the guide members. The yieldable mounting of the cap member 24 on the head plate also prevents binding of the pitman stirrup relative to the shock absorber and a convenient, efficient, economical and smooth working shock absorber is thus provided for this type of equipment.

In Fig. 5, a shock absorber is illustrated which embodies the principal features of the present invention, but which is modified relative to the showing of Fig. 1, for example, to adapt the same for interconnection between one end of a walking beam 30 and a polish rod 31.

In this instance, suitable means 32 is provided to connect the disk-like supporting base plate 33 with the walking beam and a slot, hole, or the like 34 is provided in the plate, a slot being shown in the present instance which extends from the periphery of the plate to substantially the center thereof for receiving the upper end of the polish rod. Upwardly extending sockets 35 are spaced around the upper face of the base plate 33 for receiving the lower ends of cushioning members 36, which are preferably substantially similar to the member 1, illustrated in Fig. 2.

The upper ends of the members 36 are mounted in sockets 37 spaced about the lower face of the supported head plate 38 of this form of shock absorber, the sockets being alignable to receive such members and thus resiliently support the head plate relative to the base plate. A slot or the like 39, similar to the slot 34, is preferably provided in the head plate for passing the upper end of the polish rod 31 and a suitable clamp 40 is mounted on the upper end of the polish rod and seats on the upper face of the head plate to support the polish rod relative to the walking beam. Guide members 41 are also provided on the base plate in upwardly extending relation thereto for passage through apertures alignable therewith in the head plate, springs 42 being mounted on the upper ends of the guide members 41 and seating on the upper face of the head plate. Suitable fastening devices 43 are also engaged with the upper ends of the guide members and springs to resiliently retain the head and base plates in slidable aligned relation. The guide members serve the further purpose, in cooperation with the springs and fastening devices, of preventing displacement of the polish rod relative to the shock absorber, that is from out of the slots thereof.

In the operation of the form of invention illustrated in Figs. 5 to 8, power is applied to the walking beam 10 by the pitman 44 to rock the walking beam. On the downstroke of the pitman to raise the end 30 of the walking beam, the base plate 33 is lifted by the means 32 to compress the resilient members 36 in transmitting the lift to the head plate 38 for raising the polish rod 31. The initial strains between the walking beam and polish rod are thus resiliently absorbed by the shock absorber. On changing the direction of movement of the polish rod on its downstroke, even greater stresses are applied to the walking beam and extreme shocks are common. In this instance, the weight of the rods on the head plate 38 is first absorbed by the members 36 and is subsequently transmitted to the base plate 33. The shocks are thus taken up to greatly relieve not only the walking beam but the polish rod as well. The life of this type of equipment is thus prolonged due to such relief and the efficiency of well pumping operations is increased due to minimizing need for repair by this invention.

In Figs. 9 to 11, a further modified form of invention is illustrated, showing the application of a shock absorber embodying the features of the present invention, when interposed between the water table 45 and crown block assembly 46 of a rotary drilling rig 47. In this instance, a plurality of spaced base plates 48 and 49 are suitably mounted on the water table as indicated at 50. Sockets 51 and guide members 52, however, which are substantially similar to the sockets and guide members previously described, extend upwardly from the base plates, the sockets receiving the lower ends of resilient members 53 similar to the member 1, Fig. 2, previously described, and the upper ends of such elements are mounted in sockets similar to the sockets 51, the latter sockets extending downwardly from the lower face of supported head plates 54 and 55. The head plates 54 and 55 suitably mount the base structure 56 of the crown block assembly 46 and have apertures alignable with the guide members for passing the guide members therethrough, springs 57 being mounted on the upper ends of the guide members and seating on the upper faces of the head plates, which are retained in such position by suitable fastening devices 58.

In the operation of the form of the invention illustrated in Figs. 9 to 11, cables or the like, not shown, are normally applied to the pulleys 59 and 60 for example of the crown block assembly in a conventional manner which, when actuated, create extreme pressures, strains and shocks on the crown block assembly. Instead of transmitting such shocks directly to the water table, the shocks are absorbed by the resilient members 53, the crown block assembly having resilient sliding engagement, during such actuation, with the guide member connection between the head and base plates of the shock absorber, which further enhances the absorptive effects of this shock absorber.

What I claim and desire to secure by Letters Patent is:

1. In combination with a walking beam and pitman stirrup, a shock absorber including a base plate, means connecting the base plate with one end of the walking beam, a head plate adapted to pivotally seat the pitman stirrup, resilient means interposed between said plates, and yielding means applying relative retaining pressure to the pitman stirrup and to the head plate.

2. In combination with a walking beam and pitman stirrup for applying rocking movement to the walking beam, a base plate mounted at one end of the walking beam adjacent the stirrup, a head plate, said plates having facing alignable sockets, resilient members interposed between said plates having the ends thereof mounted in said sockets, means on the head plate for pivotally seating the pitman stirrup, and yielding means applying retaining pressure to the pitman stirrup when seated on said head plate.

RICHARD C. MASON.